United States Patent
Matsushima (10) Patent No.: US 9,657,754 B2
(45) Date of Patent: May 23, 2017

(54) HYDRAULIC CIRCUIT

(75) Inventor: Nobuhisa Matsushima, Ibaraki (JP)

(73) Assignee: Bosch Rexroth Corporation, Tokyo (JP)

(*) Notice: Subject to any disclaimer, the term of this patent is extended or adjusted under 35 U.S.C. 154(b) by 0 days.

(21) Appl. No.: 14/005,552

(22) PCT Filed: Apr. 3, 2012

(86) PCT No.: PCT/JP2012/059105
§ 371 (c)(1),
(2), (4) Date: Sep. 17, 2013

(87) PCT Pub. No.: WO2013/150613
PCT Pub. Date: Oct. 10, 2013

(65) Prior Publication Data
US 2015/0020516 A1    Jan. 22, 2015

(51) Int. Cl.
*F15B 13/02* (2006.01)
*F15B 15/20* (2006.01)
(Continued)

(52) U.S. Cl.
CPC .......... *F15B 15/20* (2013.01); *F15B 11/0423* (2013.01); *F15B 13/024* (2013.01);
(Continued)

(58) Field of Classification Search
CPC .......... F15B 13/024; F15B 2211/50518; F15B 2211/55
See application file for complete search history.

(56) References Cited

U.S. PATENT DOCUMENTS

| 4,327,549 A | 5/1982 | Bianchetta et al. |
| 4,468,173 A * | 8/1984 | Dantlgraber ............ F04B 49/08 417/220 |

(Continued)

FOREIGN PATENT DOCUMENTS

| CN | 101774042 | 7/2010 |
| CN | 201972595 | 9/2011 |

(Continued)

*Primary Examiner* — F. Daniel Lopez
(74) *Attorney, Agent, or Firm* — Michael Best & Friedrich LLP (57) ABSTRACT

There is provided a hydraulic circuit which can further improve a responsive characteristic in a pressure reducing operation and a reliability in the pressure reducing operation of a relief valve device, when a main circuit pressure exceeds a predetermined pressure. A relief valve device for reducing the main circuit pressure in the hydraulic circuit including a hydraulic pump includes a first valve unit having a pilot spool and a pilot spring, a position of the pilot spool being determined by a balance between a throttle pressure supplied from the main circuit via a throttle oil passage and the control pressure and a biasing force of the pilot spring, and releasing the main circuit pressure outward via the throttle oil passage, and includes a second valve unit having a valve piston and a valve spring, a position of the valve piston being determined by a balance between the main circuit pressure and the throttle pressure and the biasing force of the valve spring, and releasing the main circuit pressure outward.

8 Claims, 8 Drawing Sheets

(51) Int. Cl.
  *F16K 17/06* (2006.01)
  *F15B 11/042* (2006.01)
  *F16K 17/30* (2006.01)
  *F15B 15/02* (2006.01)

(52) U.S. Cl.
  CPC .............. *F15B 15/02* (2013.01); *F16K 17/06* (2013.01); *F16K 17/30* (2013.01); *F15B 2211/20553* (2013.01); *F15B 2211/3111* (2013.01); *F15B 2211/50518* (2013.01); *F15B 2211/528* (2013.01); *F15B 2211/55* (2013.01); *F15B 2211/6346* (2013.01); *F15B 2211/6652* (2013.01)

(56) References Cited

U.S. PATENT DOCUMENTS 7,287,375 B2 * 10/2007 Goto .................... F15B 11/165
  60/468
2007/0245889 A1   10/2007 Breunig et al.

FOREIGN PATENT DOCUMENTS

| EP | 2351936 | 8/2011 |
| JP | 4-143471 | 5/1992 |
| JP | H06249352 | 9/1994 |
| JP | S63138026 | 6/1998 |
| JP | 3471638 | 12/2003 |
| JP | 3745038 | 2/2006 |
| JP | 2006052673 | 2/2006 |
| JP | 2007-205464 | 8/2007 |
| JP | 2012031998 | 2/2012 |

* cited by examiner

(PRIOR ART)

Fig.6

(PRIOR ART)

Fig.7

(PRIOR ART)

Fig.8

(PRIOR ART)

HYDRAULIC CIRCUIT

BACKGROUND OF THE INVENTION

The present invention relates to a hydraulic circuit including a relief valve device for reducing a main circuit pressure when the main circuit pressure exceeds a predetermined pressure in the hydraulic circuit including a hydraulic pump.

In the related art, in a hydraulic circuit including flow rate control means for controlling a discharge flow rate (discharge pressure) of a hydraulic pump in the hydraulic circuit including the hydraulic pump, when sharp fluctuations occur in the discharge flow rate of the hydraulic pump, there has been a possibility that a surge pressure is generated in a main circuit to cause damage to hydraulic equipment, pipes, fittings and hydraulic pump drive devices. Since the surge pressure generated at that time is momentarily high, even if a fixed relief valve in which a specified valve opening pressure has been set is provided in the hydraulic circuit, there has been a problem in that it is difficult to remove the surge pressure.

Figure 5:
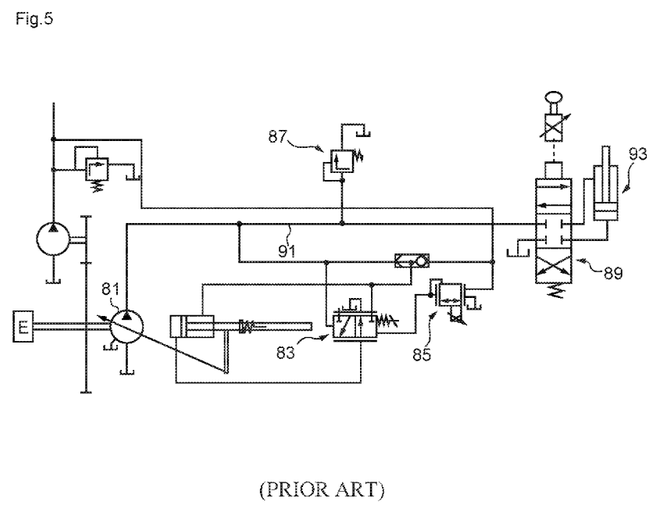
FIG. 5 is a view illustrating a hydraulic circuit using a fixed type relief valve in the related art.
Figure 6:
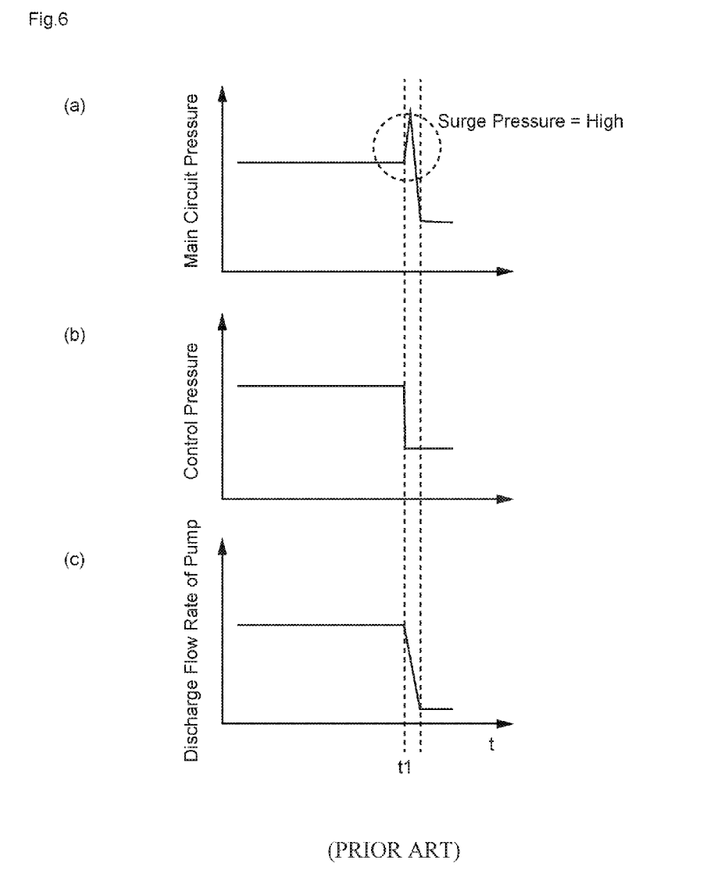
FIG. 6 shows views for explaining a surge pressure occurring in the hydraulic circuit using the fixed type relief valve.

Specifically, referring to FIGS. 5 and 6, the following will be described. FIG. 5 illustrates one configuration example of the hydraulic circuit in the related art, and FIGS. 6(a) to 6(c) respectively illustrate a main circuit pressure, a control pressure of an electromagnetic proportional pressure reducing valve and a discharge flow rate of a hydraulic pump, with respect to a time axis (t). The hydraulic circuit illustrated in FIG. 5 includes a hydraulic pump 81, flow rate control means 83 for controlling a discharge flow rate of the hydraulic pump 81, an electromagnetic proportional pressure reducing valve 85 supplying a control pressure to the flow rate control means 83 in order to allow a discharge pressure of the hydraulic pump 81 to be a setting pressure, a relief valve 87 for reducing the main circuit pressure, and an actuator 93 connected to a main circuit 91 via a closed center type directional control valve 89.

In the hydraulic circuit described above, when using the fixed relief valve having a fixed valve opening pressure, as illustrated in FIGS. 6(a) to 6(c), if the closed center type directional control valve 89 is operated to close a valve in order to suddenly stop the actuator 93, the setting pressure of the hydraulic pump 81 is reduced. Accordingly, the control pressure of the electromagnetic proportional pressure reducing valve 85 is rapidly reduced. As a result, the flow rate control means 83 is operated to decrease the discharge flow rate of the hydraulic pump 81. At this time, the closed center type directional control valve 89 is quickly closed, but in the discharge flow rate of the hydraulic pump 81, there occurs a delay from when the electromagnetic proportional pressure reducing valve 85 responds thereto until the discharge flow rate is decreased in order for the flow rate control means 83 to be operated. Then, during the period until the discharge flow rate of the hydraulic pump 81 is decreased, although the closed center type directional control valve 89 is closed, control oil is discharged in the main circuit 91 by the hydraulic pump 81. Accordingly, the surge pressure which is momentarily high in the main circuit 91 is generated. Since the fixed relief valve 87 is installed as a safety valve of the hydraulic circuit, in which the valve opening pressure is set to have a high value, it cannot cope with the surge pressure.

Figure 7:
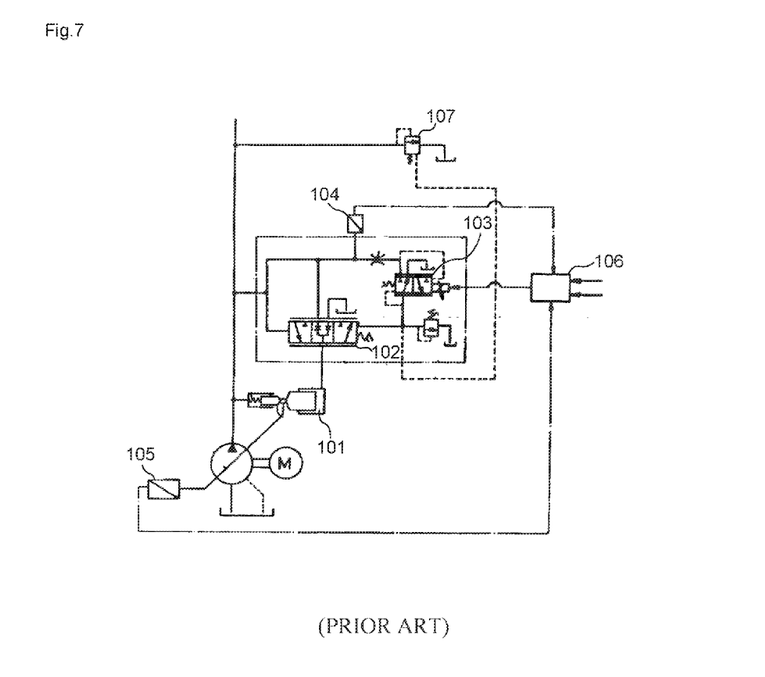
FIG. 7 is a view illustrating a hydraulic valve using a variable relief valve in the related art.

In contrast, a hydraulic circuit has been proposed which uses a pilot type variable relief valve controlling the setting pressure of the hydraulic pump by using the control pressure of the electromagnetic proportional pressure reducing valve and receiving the control pressure as a pilot pressure. Specifically, as illustrated in FIG. 7, in a variable capacity type pump including a servo piston mechanism for changing a tilt angle, a controller of the variable capacity type pump is disclosed which includes a differential-pressure spool valve 102 interposed in an oil passage from a large servo chamber 101 of the servo piston mechanism disposed in the oil passage leading to a discharge oil passage, receiving the discharge pressure and the control pressure, and controlling a hydraulic pressure of the large servo chamber 101 so as to increase the tilt angle according to decrease in a differential pressure between the discharge pressure and the control pressure; an electromagnet proportional pressure reducing control valve 103 receiving the discharge pressure, reducing the discharge pressure and generating the control pressure corresponding to a solenoid drive current; pressure detection means 104 converting the discharge pressure into an electrical signal; flow rate detection means 105 converting the discharge flow rate into the electrical signal; control means (controller) 106 receiving an output of both of the above-described detection means, receiving a pressure setting signal and a flow rate setting signal, controlling and outputting the solenoid drive current based on deviation of one whose tilt angle is smaller, out of the deviation between the pressure setting signal and the detected pressure and the deviation between the flow rate setting signal and the detected flow rate; and a pilot type relief valve 107 connected to the discharge oil passage, receiving the control pressure as a pilot pressure, and capable of changing the setting pressure (valve opening pressure)(refer to JP-A-4-143471).

SUMMARY OF INVENTION

Technical Problem

Figure 8:
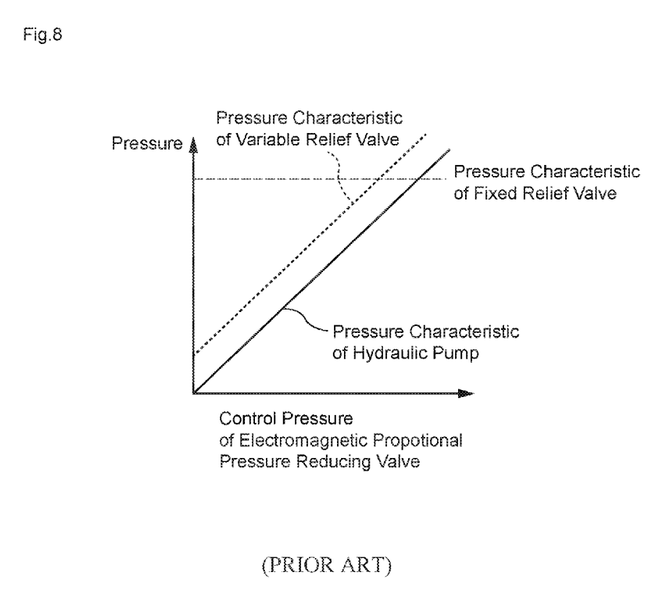
FIG. 8 is a view illustrating a pressure characteristic of the variable relief valve in the related art.

It is considered that a controller of the variable capacity type pump disclosed in JP-A-4-143471, although not particularly described, as illustrated in FIG. 8, is configured to have a constant differential-pressure ΔP, regardless of a control pressure, between a pressure characteristic of a variable capacity type pump which indicates a relationship of the control pressure of an electromagnetic proportional pressure reducing valve and a setting pressure of the variable capacity type pump and a pressure characteristic of a variable relief valve which indicates a relationship of the control pressure of the electromagnetic proportional pressure reducing valve and the setting pressure of the variable relief valve. However, if the pressure characteristic of the variable relief valve has the above-described characteristic, a responsive characteristic in a pressure reducing operation of the variable relief valve with respect to pressure variations inside a main circuit is improved. However, there has been a possibility that if the differential-pressure ΔP is set to be small, the variable relief valve is likely to perform an unintended valve opening operation with respect to the pressure variations inside the main circuit, whereas if the differential-pressure ΔP is set to be large, and thus, a surge pressure may be largely increased, since the variable relief valve is unlikely to be opened.

Therefore, the present invention aims to provide a hydraulic circuit which can further improve the responsive characteristic in the pressure reducing operation and a reliability in the pressure reducing operation of a relief valve device, when the main circuit pressure exceeds a predetermined pressure.

Solution to Problem

According to the present invention, in order to solve the above-described problem, there is provided a hydraulic circuit including a hydraulic pump; operation means for setting a setting pressure of the hydraulic pump; flow rate control means for controlling a discharge flow rate of the hydraulic pump; control means for supplying a control pressure to the flow rate control means in order to set a discharge pressure of the hydraulic pump to be the setting pressure; a relief valve device for reducing a main circuit pressure when the main circuit pressure exceeds a predetermined pressure; and an actuator connected to the main circuit via a closed center type directional control valve. The relief valve device includes a first valve unit having a pilot spool and a pilot spring, a position of the pilot spool being determined by a balance between a throttle pressure supplied from the main circuit via a throttle oil passage and, the control pressure and a biasing force of the pilot spring, and releasing the main circuit pressure outward via the throttle oil passage, and includes a second valve unit having a valve piston and a valve spring, a position of the valve piston being determined by a balance between the main circuit pressure and, the throttle pressure and the biasing force of the valve spring, and releasing the main circuit pressure outward.

That is, in the hydraulic circuit of the present invention, the second valve unit is separately disposed in addition to the first valve unit having a pilot type variable relief valve structure, and the second valve unit is also configured to be opened in response to opening of the first valve unit. Therefore, it is possible to ensure reliability in a pressure reducing operation by setting a differential-pressure AP between the setting pressure of the hydraulic pump and the setting pressure of the relief valve device to a desired magnitude, and to improve a responsive characteristic in the pressure reducing operation owing to an increased pressure reducing speed.

In addition, in configuring the hydraulic circuit of the present invention, it is preferable that the pilot spool of the first valve unit be configured to receive the throttle pressure as a pushing force to one side, and to receive the control pressure and the biasing force of the pilot spring as the pushing force to the other side, and the valve piston of the second valve unit be configured to receive the main circuit pressure as the pushing force to one side, and to receive the throttle pressure and the biasing force of the valve spring as the pushing force to the other side.

If the first valve unit and the second valve unit are configured in this manner, the setting pressure of the first valve unit is changed according to the control pressure of the electromagnetic proportional pressure reducing valve, and the second valve unit is opened according to a decrease in the throttle pressure which is caused by the opening of the first valve unit. Therefore, the reliability in the pressure reducing operation and the responsive characteristic in the pressure reducing operation of the relief valve device are improved.

In addition, in configuring the hydraulic circuit of the present invention, it is preferable that in a pressure characteristic of the relief valve device, according to an increase in the control pressure, a differential-pressure between the setting pressure of the hydraulic pump and the setting pressure of the relief valve device be decreased.

If the relief valve device is allowed to have the pressure characteristic, it is possible to increase the differential-pressure between the setting pressure of the hydraulic pump and the setting pressure of the relief valve device when the control pressure of the electromagnetic proportional pressure reducing valve is low, and to decrease the differential-pressure between the setting pressure of the hydraulic pump and the setting pressure of the relief valve device when the control pressure of the electromagnetic proportional pressure reducing valve is high. Therefore, whereas it is possible to cause the pressure reducing operation to be unlikely to occur when the main circuit pressure is low, it is possible to cause the pressure reducing operation to be likely to occur when the main circuit pressure is high. At this time, a surge pressure is likely to be high when the main circuit pressure is low. However, since the pressure itself in the main circuit is low, there is no possibility of causing damage to hydraulic equipment.

In addition, in configuring the hydraulic circuit of the present invention, it is preferable that the differential-pressure between the setting pressure of the hydraulic pump and the setting pressure of the relief valve device can be adjusted by decreasing a pressure receiving area of the throttle pressure in the pilot spool of the first valve unit to be smaller than a pressure receiving area of the control pressure, and by adjusting a spring force of the pilot spring of the first valve unit.

If the relief valve device has the above-described configuration, it is possible to easily achieve the characteristic where the differential-pressure between the setting pressure of the hydraulic pump and the setting pressure of the relief valve device is decreased according to the increase in the control pressure of the electromagnetic proportional pressure reducing valve, depending on a difference of the pressure receiving areas. It is possible to set the magnitude of the differential-pressure to a desired magnitude depending on the spring force of the pilot spring.

DETAILED DESCRIPTION

1. Overall Configuration of Hydraulic Circuit

A configuration example of a hydraulic circuit according to the present embodiment will be described with reference to the drawings.

Figure 1:
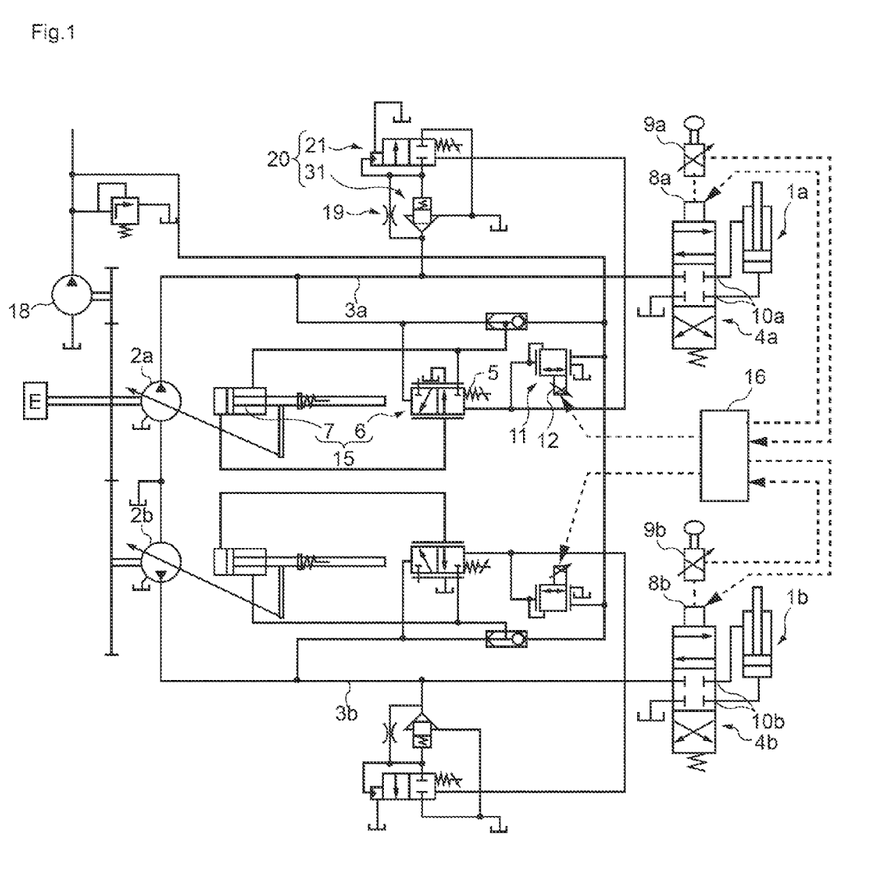
FIG. 1 is a view illustrating a configuration example of a hydraulic circuit of the present embodiment.

FIG. 1 illustrates an example of the hydraulic circuit applied to a hydraulic excavator and controlling an operation of multiple hydraulic actuators $1a$ and $1b$. The hydraulic circuit includes two variable capacity type hydraulic pumps $2a$ and $2b$ connected to a drive device E such as an engine, and one fixed capacity type hydraulic pump 18. The variable capacity type hydraulic pumps $2a$ and $2b$ are those known such as an axial piston pump including a pump capacity control mechanism of a cam plate. The respective actuators 1a and 1b are connected to main circuits 3a and 3b to which a discharge pressure of the hydraulic pumps 2a and 2b is introduced, via closed center type directional control valves 4a and 4b.

Flow rate control means 15 controlling a discharge flow rate of the hydraulic pumps 2a and 2b or a discharge pressure includes a control valve 6 and a control piston 7. A main circuit pressure Preal, a biasing force of a spring 5 and a control pressure Pc controlled by an electromagnetic proportional pressure reducing valve 11 as control means are applied to both ends of a spool of the control valve 6. However, both ends of the spool are allowed to have a proper area difference and thus, the control valve 6 is adequately controlled by the balance therebetween.

The electromagnetic proportional pressure reducing valve 11 is controlled by a balance between the control pressure Pc and a force generated by a proportional solenoid 12 varied in proportion to a control current input based on a control signal by a controller 16.

In addition, the closed center type directional control valves 4a and 4b include proportional solenoids 8a and 8b moving the spool. If operation means 9a and 9b such as an electrical joystick are operated, the proportional solenoids 8a and 8b are excited by the controller 16 according to a tilt angle of the operation means 9a and 9b. This moves the spool of the closed center type directional control valves 4a and 4b to a desired position, and controls actuator ports 10a and 10b to have an opening area according to a movement distance thereof. As a result, control oil with a flow rate according to the opening area is supplied to the actuators 1a and 1b.

A command amount such as the tilt angle of the operation means 9a and 9b for operating the respective closed center type directional control valves 4a and 4b or a movement amount of the spool of the respective closed center type directional control valves 4a and 4b is electrically detected by a sensor, and the command amount or the movement amount become an operation amount signal S based on an operation amount of the respective closed center type directional control valves 4a and 4b. In the example of FIG. 1, an electrical command signal generated from the operation means 9a and 9b by the controller 16 is adapted to be used as the operation amount signal S.

As the operation means 9a and 9b, for example, a hydraulic joystick can also be used in addition to the electrical joystick. In this case, if a pilot pressure by the hydraulic joystick is detected by using pressure detection means such as a pressure sensor, or the movement amount of the spool of the closed center type directional control valve is electrically detected, it is possible to use these values as the operation amount signal S.

The above-described operation amount signal S is used to set a setting pressure of the hydraulic pumps 2a and 2b. According to the setting pressure of the hydraulic pumps 2a and 2b, the control current of the electromagnetic proportional pressure reducing valve 11 which is output from the controller 16 is determined, and the flow rate control means 15 is controlled by the control pressure Pc of the electromagnetic proportional pressure reducing valve 11 according to the control current. In this manner, the discharge pressure of the hydraulic pumps 2a and 2b is controlled. The setting pressure of the hydraulic pumps 2a and 2b corresponds to a target pressure of the main circuit pressure Preal.

Figure 2:
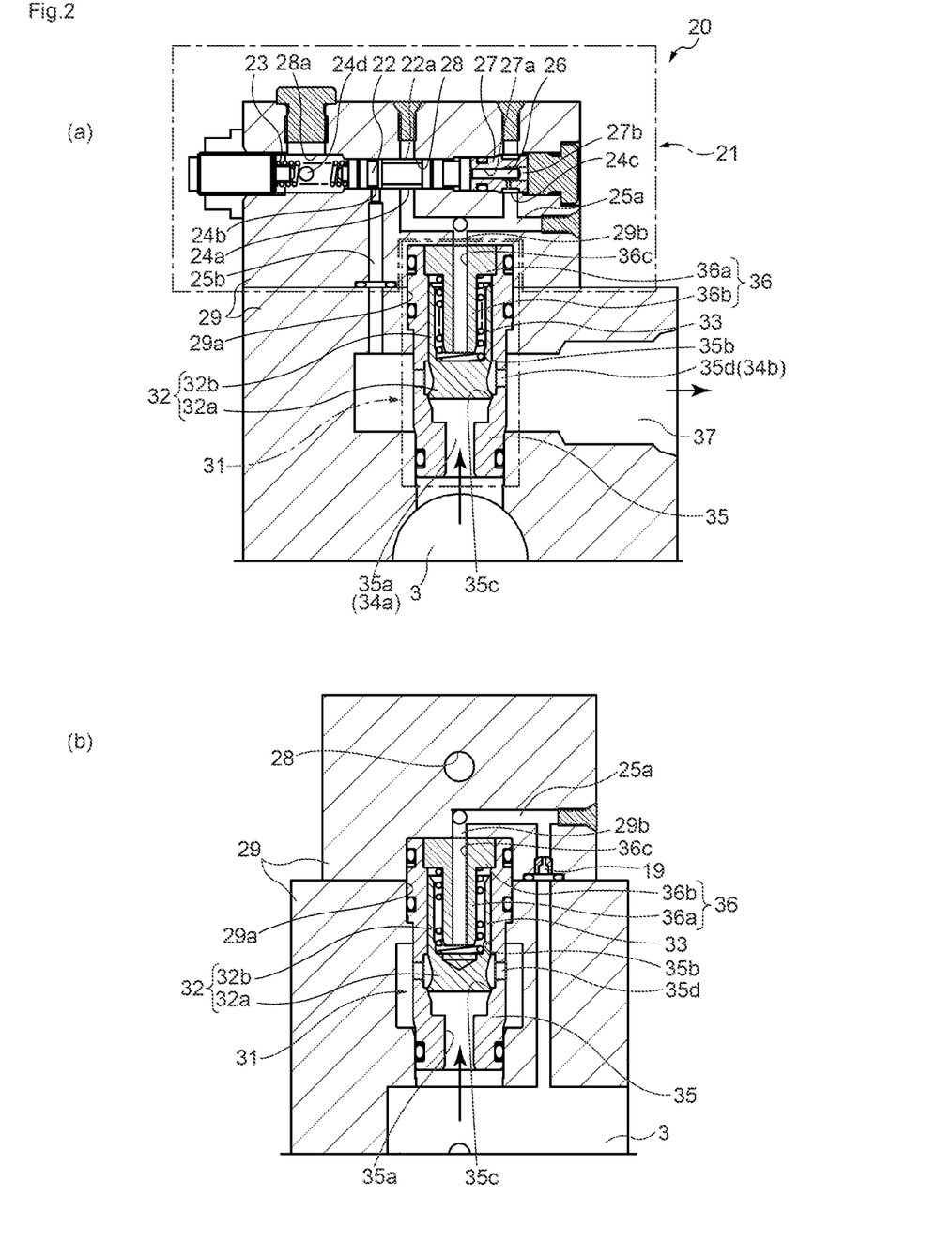
FIG. 2 shows views illustrating a specific configuration example of a relief valve device provided in the hydraulic circuit of the present embodiment.

A relief valve device 20 is connected to the main circuits 3a and 3b of the hydraulic circuit in the present embodiment. The relief valve device 20 includes a first valve unit 21 and a second valve unit 31. As illustrated in FIG. 2(a), the first valve unit 21 has a pilot spool 22 and a pilot spring 23. The pilot spool 22 receives a throttle pressure Ps supplied from the main circuits 3a and 3b via a throttle passage 19 as a pushing force against one side (leftward direction in FIG. 2(a)), and receives the control pressure Pc controlled by the electromagnetic proportional pressure reducing valve 11 as the pushing force against the other side (rightward direction in FIG. 2(a)). In addition, the pilot spring 23 has a force of pushing the pilot spool 22 against the other side (rightward direction in FIG. 2(a)).

Basically, the throttle pressure Ps has a value equal to the value of the main circuit pressure Preal of the hydraulic pumps 2a and 2b. However, since the throttle passage 19 is disposed, the throttle pressure Ps has the value smaller than that of the main circuit pressure Preal in an initial stage where the main circuit pressure Preal increases, and the throttle pressure Ps has the value larger than that of the main circuit pressure Preal in the initial stage where the main circuit pressure Preal decreases.

Therefore, a position of the pilot spool 22 is determined by a balance between the pushing force against one side using the throttle pressure Ps and the pushing force against the other side which is the sum of the pushing force using the control pressure Pc and the biasing force of the pilot spring 23. The main circuit pressure Preal introduced as the throttle pressure Ps is also introduced to an inlet port 24a of the first valve unit 21. When the pushing force against one side which is loaded on the pilot spool 22 exceeds the pushing force against the other side, and the pilot spool 22 is moved such that the inlet port 24a and an outlet port 24b are in a communication state, the main circuit pressure Preal is discharged to a tank.

In addition, the second valve unit 31 has a valve piston 32 and a valve spring 33. The valve piston 32 receives the main circuit pressure Preal via an inlet port 34a as the pushing force against one side (upper side in FIG. 2(a)), and receives the throttle pressure Ps supplied from the main circuits 3a and 3b via the throttle passage 19 as the pushing pressure against the other side (lower side in FIG. 2(b)). In addition, the valve spring 33 has a force of pushing the valve piston 32 against the other side (lower side in FIG. 2(a)).

Therefore, a position of the valve piston 32 is determined by a balance between the pushing force against one side using the main circuit pressure Preal and the pushing force against the other side which is the sum of the pushing force using the throttle pressure Ps and the biasing force of the valve spring 33. When the pushing force against one side exceeds the pushing force against the other side, and the valve piston 32 is moved such that the inlet port 34a and an outlet port 34b are in a communication state, the main circuit pressure Preal is discharged to a tank.

2. Configuration Example of Relief Valve Device

Next, a specific configuration example of the relief valve device 20 disposed in the hydraulic circuit according to the present embodiment will be described with reference to FIGS. 2(a) and 2(b).

FIG. 2(a) illustrates a cross-sectional view of the relief valve device 20 cut along an axial direction of the pilot spool 22, and FIG. 2(b) illustrates a cross-sectional view of the relief valve device 20 cut along a direction orthogonal to the axial direction of the pilot spool 22.

The first valve unit 21 included in the relief valve device 20 includes a spool hole 28 formed in a housing 29, the pilot spool 22 arranged to be axially movable into the spool hole 28, a pin holding member 27 fixedly arranged at the spool hole 28 in one end side of the pilot spool 22, a pin 26 held to be axially movable into a pin sliding hole 27a formed in the pin holding member 27 and whose tip comes into contact with one end surface of the pilot spool 22, and the pilot spring 23 arranged at the other end side of the pilot spool 22 and biasing the pilot spool 22.

A center portion of the pilot spool 22 in the axial direction is reduced in diameter, configured to be an oil passage 22a, and to be communicable with the inlet port 24a and the outlet port 24b which are formed in the housing 29. The inlet port 24a is connected to the oil passage 25a, and a throttle pressure introduction port 24c is also connected to the oil passage 25a. That is, the same pressure is supplied to the inlet port 24a and the throttle pressure introduction port 24c. The oil passage 25a is connected to the main circuit 3 via the throttle passage 19 (refer to FIG. 2(b)). In addition, the outlet port 24b is connected to an oil passage 25b communicating with an oil discharge passage 37.

A pressure introduction chamber 27b is formed contiguous to the pin sliding hole 27a in the pin holding member 27, and one end surface (right end surface in FIG. 2(a)) of the pin 26 is located inside the pressure introduction chamber 27b. The pressure (throttle pressure Ps) is introduced to the pressure introduction chamber 27b via the throttle pressure introduction port 24c. If the right end surface of the pin 26 receives the throttle pressure Ps, the pin 26 presses the pilot spool 22 to one side (leftward direction in FIG. 2(a)).

In addition, the control pressure Pc controlled by the electromagnetic proportional pressure reducing valve 11 is introduced via a control pressure introduction port 24d to a spring chamber 28a in which the pilot spring 23 is arranged. If the other end surface (left end surface in FIG. 2(a)) of the pilot spool 22 receives the control pressure Pc, the pilot spool 22 is pressed to the other side (rightward direction in FIG. 2(a)) conjointly with the biasing force of the pilot spring 23.

That is, if a pressure receiving area of the right end surface of the pin 26 which receives the throttle pressure Ps is set to A1, a pressure receiving area of the left end surface of the pilot spool 22 which receives the control pressure Pc is set to A2, and a biasing force of the pilot spring 23 is set to Fsp, a pushing force Fa against one side which acts on the right end surface of the pilot spool 22 via the pin 26 and a pushing force Fb against the other side which acts on the left end surface are expressed by the following equation.

$$Fa = Ps \times A1 \quad \text{(Equation 1)}$$

$$Fb = Pc \times A2 + Fsp \quad \text{(Equation 2)}$$

Therefore, when the pushing force Fa against one side exceeds the pushing force Fb against the other side (Fa>Fb), the pilot spool 22 is moved to one side (left side in FIG. 2(a)). When the pushing force Fb against the other side is equal to or greater than the pushing force Fa against one side (Fb≥Fa), the pilot spool 22 is moved to the other side (right side in FIG. 2(a)).

In a state where Fb≥Fa is established, and the pilot spool 22 comes into contact with the pin holding member 27, the oil passage 22a communicates only with the inlet port 24a. Since the outlet port 24b is closed, the main circuit pressure Preal cannot be discharged to the tank via the first valve unit 21. On the other hand, if Fa>Fb is established, and the pilot spool 22 is moved to one side (leftward direction in FIG. 2(a)), the oil passage 22a communicates with the inlet port 24a and the outlet port 24b. Accordingly, the main circuit pressure Preal can be discharged to the tank via the first valve unit 21.

In addition, the second valve unit 31 provided in the relief valve device 20 includes a piston housing 35 accommodated in an insertion hole 29a of the housing 29, a valve piston 32 held inside the piston housing 35, and a valve spring 33 biasing the valve piston 32 downward.

The insertion hole 29a of the housing 29 is disposed along a direction intersecting with the axial direction of the spool hole 28, and the insertion hole 29a and the oil passage 25a communicate with each other via a communication passage 29b. The piston housing 35 has an oil passage hole 35a continuously formed in the axial direction and a piston slide hole 35b, and the oil passage hole 35a communicates with the main circuit 3. Therefore, a lower end surface of the valve piston 32 receives the main circuit pressure Preal and is pressed to one side (upward in FIG. 2(a)). A spring seat 36 is inserted to the piston slide hole 35b from an end portion opposite to the oil passage hole 35a. The spring seat 36 has a spring seat portion 36a receiving an upper end of the valve spring 33, and a rod portion 36b inserted into the valve spring 33.

The valve piston 32 has a seat portion 32a coming into contact with a seat surface 35c of the piston housing 35, and a guide portion 32b whose outer peripheral surface slides with the piston slide hole 35b and which guides the valve piston 32 to move in the axial direction. The valve spring 33 and the rod portion 36b locate inside the guide portion 32b. An oil passage 36c penetrating in the axial direction is formed in the spring seat 36 so as to allow the interior of the valve piston 32 and the communication passage 29b to communicate with each other. Therefore, if the pressure (throttle pressure Ps) of the oil passage 25a is introduced into the valve piston 32 and the valve piston 32 receives the throttle pressure Ps, the valve piston 32 is pressed to the other side (downward in FIG. 2(a)) conjointly with the biasing force of the valve spring 33.

In addition, a discharge hole 35d which is to be the outlet port 34b is formed in the piston housing 35. When the seat portion 32a of the valve piston 32 is separated from the seat surface 35c of the piston housing 35, the main circuit pressure Preal of the main circuit 3 which is to be introduced to the oil passage hole 35a as the inlet port 34a is adapted to be introduced to the oil discharge passage 37.

In the relief valve device 20 having such a configuration according to the present embodiment, when the main circuit pressure Preal is in a stable state, the main circuit pressure Preal, the control pressure Pc of the electromagnetic proportional pressure reducing valve 11, and the biasing force Fsp of the pilot spring 23 are balanced. Accordingly, the pushing force Fa against one side of the pilot spool 22 is weaker than the pushing force Fb against the other side (Fb≥Fa), and the inlet port 24a and the outlet port 24b of the first valve unit 21 are blockaded. At this time, since the throttle pressure Ps inside the oil passage 25a becomes the pressure equivalent to the main circuit pressure Preal, a force of pressing the valve piston 32 downward prevails as much as the biasing force of the valve spring 33, and thus, the second valve unit 31 is not opened.

On the other hand, if the main circuit pressure Preal starts to rise rapidly, the pushing force Fa against one side of the pilot spool 22 exceeds the pushing force Fb against the other side (Fa>Fb), the pilot spool 22 is pressed by the pin 26, and the inlet port 24a and the outlet port 24b communicate with each other to allow a valve opening state. As a result, the main circuit pressure Preal supplied to the oil passage 25a is discharged outside (to the tank) via the oil passage 25b and the oil discharge passage 37.

At this time, since the throttle passage 19 is disposed, the throttle pressure Ps inside the oil passage 25a is lower than the main circuit pressure Preal received by the lower end surface of the valve piston 32. Then, a force of pressing the valve piston 32 downward is weakened, the valve piston 32 prevails against the biasing force of the valve spring 33, and is moved upward to allow the valve opening state. In this manner, the main circuit pressure Preal inside the main circuit 3 is discharged outside (to the tank) via the oil passage hole 35a, the discharge hole 35d and the oil discharge passage 37. Thus, in the relief valve device 20 according to the present embodiment, according to the opening of the first valve unit 21 having the pilot type variable relief valve structure, the second valve unit 31 is configured to be also opened.

Figure 3:
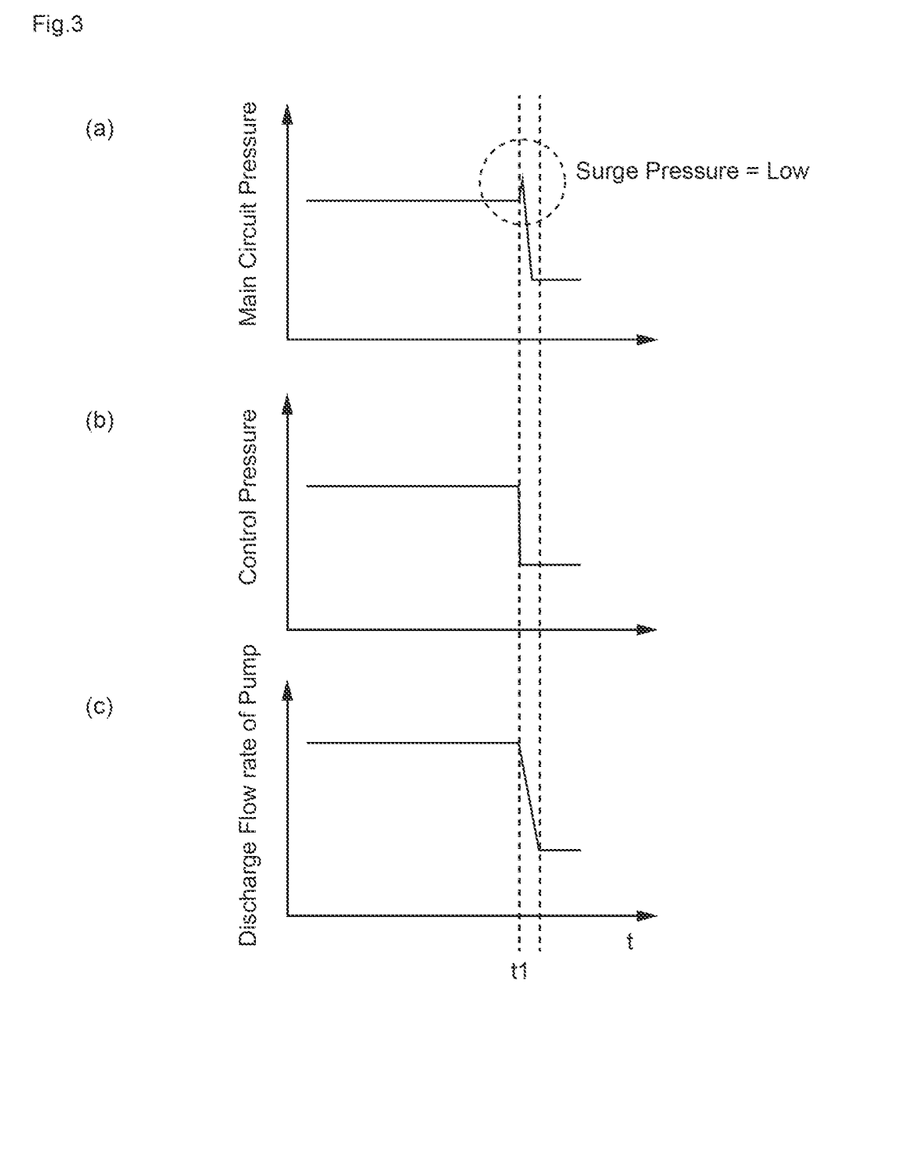
FIG. 3 shows views for explaining a surge pressure occurring in the hydraulic circuit of the present embodiment.

FIGS. 3(a) to 3(c) respectively illustrate changes, on a time axis (t), in the main circuit pressure Preal, the control pressure Pc of the electromagnetic proportional pressure reducing valve 11, and the discharge flow rate of the hydraulic pumps 2a and 2b, when the main circuit pressure Preal is reduced in the hydraulic circuit according to the present embodiment. The control pressure Pc of the electromagnetic proportional pressure reducing valve 11 and the discharge flow rate of the hydraulic pumps 2a and 2b are basically similar to those of FIG. 6.

As can be seen from FIGS. 3(a) and 3(b), since the second valve unit 31 is disposed to be opened according to the opening of the first valve unit 21, the hydraulic circuit according to the present embodiment has the excellent responsive characteristic in the pressure reducing operation, thereby controlling the surge pressure to be low.

Particularly, in the first valve unit 21 of the relief valve device 20 according to the present embodiment, a pressure receiving area A1 of the pin 26 which receives the throttle pressure Ps is adapted to be smaller than a pressure receiving area A2 of the pilot spool 22 which receives the control pressure Pc. The first valve unit 21 is opened when the pushing force Fa indicated by Equation 1 described above exceeds the pushing force Fb indicated by Equation 2. Therefore, the pressure characteristic of the relief valve device 20 is configured such that according to the increase in the control pressure Pc, the differential-pressure ΔP between the setting pressure of the hydraulic pumps 2a and 2b and the setting pressure (valve opening pressure) of the relief valve device 20 is decreased.

Figure 4:
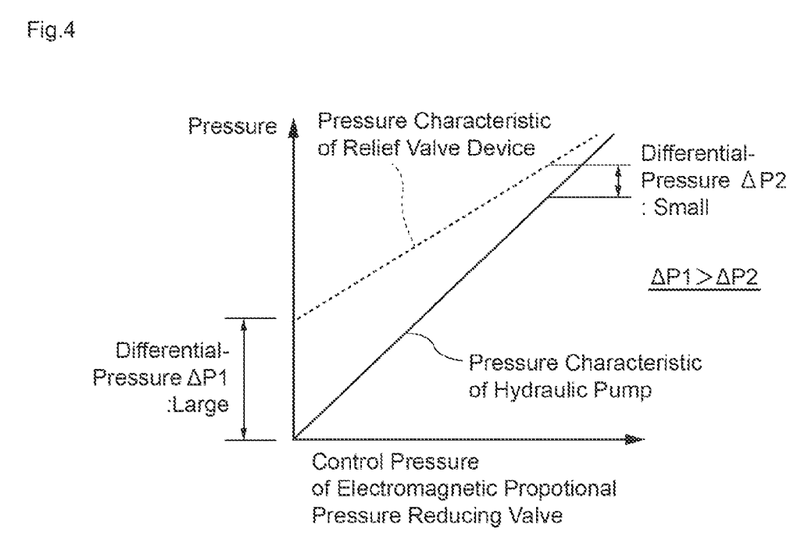
FIG. 4 is a view illustrating a pressure characteristic of the relief valve device provided in the hydraulic circuit of the present embodiment.

Specifically, the following will be described with reference to FIG. 4. With regard to the pressure characteristic of the relief valve device 20 according to the present embodiment and the pressure characteristic of the hydraulic pumps 2a and 2b, FIG. 4 illustrates a value of the setting pressure of the hydraulic pumps 2a and 2b and a value of the setting pressure of the relief valve device 20 with respect to the control pressure Pc controlled by the electromagnetic proportional pressure reducing valve 11. As illustrated in FIG. 4, the tilt of the pressure characteristic of the relief valve device 20 according to the present embodiment is smaller than the tilt of the pressure characteristic of the hydraulic pumps 2a and 2b, and the differential-pressure ΔP is decreased according to the increase in the control pressure Pc.

Therefore, when the control pressure Pc is low, that is, when the main circuit pressure Preal is low, the pressure reducing operation is unlikely to occur. In contrast, when the main circuit pressure Preal is high, it is possible that the pressure reducing operation is likely to occur. As a result, it is possible to reduce damage to hydraulic equipment which is caused by the occurrence of the higher surge pressure inside the main circuit 3.

In addition, the magnitude of the differential-pressure ΔP between the setting pressure of the relief valve device 20 and the setting pressure of the hydraulic pumps 2a and 2b can be controlled by changing a spring force of the pilot spring 23 of the first valve unit 21. Therefore, it is possible to easily obtain a desired differential-pressure ΔP.

3. Advantageous Effect

According to the hydraulic circuit of the present embodiment as described above, the second valve unit 31 is disposed separately from the first valve unit 21 having the pilot type variable relief valve structure, and the second valve unit 31 is configured to be also opened in response to the opening of the first valve unit 21. Therefore, it is possible to ensure the reliability in the pressure reducing operation by setting the differential-pressure ΔP between the setting pressure of the hydraulic pumps 2a and 2b and the setting pressure of the relief valve device 20 to a desired magnitude, and owing to the increased pressure reducing speed, it is possible to improve the responsive characteristic in the pressure reducing operation.

In addition, in the hydraulic circuit according to the present embodiment, in order to maintain not only the responsive characteristic in the pressure reducing operation but also the main circuit pressure Preal or the discharge flow rate during a non-operation period, the relief valve device 20 is required to have a leakage amount as less as possible. Since configuring components of the first valve unit 21 can be reduced, the excellent responsive characteristic can be obtained. Since the second valve unit 31 employs a seat type valve, the leakage amount can be decreased, an opening gain can be increased during the valve opening, and a large amount of the control oil can be momentarily passed. Therefore, it is possible to effectively reduce the surge pressure occurring inside the main circuit 3.

What is claimed is:

1. A hydraulic circuit comprising:
a hydraulic pump;
operation means for setting a setting pressure of the hydraulic pump;
flow rate control means for controlling a discharge flow rate of the hydraulic pump;
control means for supplying a control pressure to the flow rate control means in order to set a discharge pressure of the hydraulic pump to be the setting pressure;
a relief valve device for reducing the discharge pressure when the discharge pressure exceeds a setting pressure of the relief valve; and
an actuator connected to the main circuit via a closed center type directional control valve,
wherein the relief valve device includes a first spool valve having a pilot spool and a pilot spring, the pilot spool having a throttle pressure receiving area that receives a throttle pressure supplied from the main circuit via a throttle passage, and having a control pressure receiving area that receives the control pressure, a position of the pilot spool being determined by a balance between the throttle pressure and a sum of the control pressure and a biasing force of the pilot spring, and the first spool valve releasing the throttle pressure outward in a valve opening state, wherein the throttle pressure receiving area does not change regardless of the position of the pilot spool, and
includes a second valve unit having a valve piston and a valve spring, a position of the valve piston being determined by a balance between the discharge pressure and a sum of the throttle pressure and the biasing force of the valve spring, and the second valve unit releasing the discharge pressure outward in the valve opening state.

2. The hydraulic circuit according to claim 1,
wherein the pilot spool of the first spool valve is configured to receive the throttle pressure as a pushing force to one side, and to receive the control pressure and the biasing force of the pilot spring as the pushing force to the other side, and
wherein the valve piston of the second valve unit is configured to receive the discharge pressure as the pushing force to one side, and to receive the throttle pressure and the biasing force of the valve spring as the pushing force to the other side.

3. The hydraulic circuit according to claim 2,
wherein in a pressure characteristic of the relief valve device, according to an increase in the control pressure, a differential-pressure between the setting pressure of the hydraulic pump and the setting pressure of the relief valve device is decreased.

4. The hydraulic circuit according to claim 3,
wherein the differential-pressure between the setting pressure of the hydraulic pump and the setting pressure of the relief valve device can be adjusted by decreasing the throttle pressure receiving area in the pilot spool of the first spool valve to be smaller than the control pressure receiving area, and by adjusting a spring force of the pilot spring of the first spool valve.

5. The hydraulic circuit according to claim 2,
wherein a differential-pressure between the setting pressure of the hydraulic pump and the setting pressure of the relief valve device can be adjusted by decreasing the throttle pressure receiving area in the pilot spool of the first spool valve to be smaller than the control pressure receiving area, and by adjusting a spring force of the pilot spring of the first spool valve.

6. The hydraulic circuit according to claim 1,
wherein in a pressure characteristic of the relief valve device, according to an increase in the control pressure, a differential-pressure between the setting pressure of the hydraulic pump and the setting pressure of the relief valve device is decreased.

7. The hydraulic circuit according to claim 6,
wherein the differential-pressure between the setting pressure of the hydraulic pump and the setting pressure of the relief valve device can be adjusted by decreasing the throttle pressure receiving area in the pilot spool of the first spool valve to be smaller than the control pressure receiving area, and by adjusting a spring force of the pilot spring of the first spool valve.

8. The hydraulic circuit according to claim 1,
wherein a differential-pressure between the setting pressure of the hydraulic pump and the setting pressure of the relief valve device can be adjusted by decreasing the throttle pressure receiving area in the pilot spool of the first spool valve to be smaller than the control pressure receiving area, and by adjusting a spring force of the pilot spring of the first spool valve.

* * * * *